United States Patent [19]

Powell

[11] 4,306,629
[45] Dec. 22, 1981

[54] PNEUMATIC WEIGHING DEVICE AND METHOD
[75] Inventor: John L. Powell, Turlock, Calif.
[73] Assignee: Geosource Inc., Houston, Tex.
[21] Appl. No.: 203,651
[22] Filed: Nov. 3, 1980

Related U.S. Application Data
[63] Continuation of Ser. No. 5,026, Jan. 19, 1979, abandoned.
[51] Int. Cl.³ ............................................. G01G 5/00
[52] U.S. Cl. ........................................ 177/1; 177/145; 177/177; 177/208; 406/34; 406/88
[58] Field of Search ............... 177/208, 209, 207, 254, 177/145, 1; 406/88, 89, 34, 31, 19; 209/592

[56] References Cited
U.S. PATENT DOCUMENTS 2,564,221  8/1951  Hornfeck .................... 177/210 EM
3,180,475  4/1965  Del Rosso .......................... 198/504
3,317,039  5/1967  Wadey ................................. 209/592
3,603,646  9/1971  Leoff ..................................... 406/89
3,672,457  6/1972  Hester ................................ 177/201
3,848,180  11/1974 Jonke et al. ........................ 73/728 X
3,907,099  9/1975  Smith .................................. 198/220
4,024,944  5/1977  Adams et al. ...................... 198/394

Primary Examiner—Joseph W. Hartary
Attorney, Agent, or Firm—Arnold, White & Durkee

[57] ABSTRACT

Disclosed is a device for detecting the weight of an article by measuring the amount of pressure required to support the article. The weighing device is characterized by a weighing table having a plurality of apertures for receiving compressed air. The pressure required to support the gross weight of an article passing over the apertures is sensed by a pressure transducer and translated into an electrical signal used to derive the actual numerical weight of the article.

13 Claims, 4 Drawing Figures

PNEUMATIC WEIGHING DEVICE AND METHOD

This is a continuation of application, Ser. No. 5,026, filed Jan. 19, 1979 now abandoned.

BACKGROUND OF THE INVENTION

This invention relates to a pneumatic weighing device and method, and more particularly to a weighing device capable of receiving articles to be weighed at high speeds.

In many manufacturing process, especially in the canning industry, quantity control is a very important parameter. To achieve efficiency in the weighing function in any canning process, for example, it is necessary to eliminate manual weighing of the individual articles. Automatic high speed weighing systems are utilized to move large quantities of product over a conventional scale to separate the product falling outside a predetermined weight range.

In some high speed weighing systems conveyor belts are used to transport products. The conveying system transports the product to a weigh conveyor having a lightweight belt material, or an endless chain system, and operating in a fashion to move over a conventional scale. Thus, when a product is transferred to the lightweight conveyor the weight of that product will be determined as it moves over the scale.

Since a conventional scale having either torsion or compression springs are utilized in these systems many disadvantages result. For example, there is a required damping time or settling time after each individual product is weighed. Since there must be an interruption in time between weighing individual products, a further problem of spacing the objects to be weighed is encountered. By moving a conveyor belt over the scale there is also mechanical vibration to overcome. Although dashpots and other damping elements have been used to solve many of these problems, spring loaded scales tend to either overact or counteract. Also, since the product to be weighed is being transported over a conventional spring loaded scale, lightweight belts are necessary on the conveyor to eliminate added weight on the scale. Repeated use of these lightweight belts will yield to mechanical wear and increase the cost of operation of the weighing process.

Thus, the major disadvantage in existing weighing devices utilized for high speed weighing is in the interdependence of the transport mechanism and the weighing mechanism.

SUMMARY OF THE INVENTION

The weighing device provided in the present invention is pneumatic in nature and capable of weighing articles at high rates of speed. The weight of the article is calculated from the proportional relationship of the pressure needed to support the article and the area surface of the article to its numerical weight. The weighing device further provides a means of weighing product having a wide range of sizes and weight.

The pneumatic weighing device in accordance with the present invention utilizes a weighing table having an air chamber which is connected to a compressor supplying pressurized air. Pressurized air forced through the support holes in the top of the weighing table forms an air cushion for transporting the article to be weighed. The pressure required to support the article as it passes over the weighing table may be detected at any support hole and sensed at a pressure transducer which translates the required support pressure into an electrical voltage signal for numerical weight calculation.

An outstanding feature of the present invention is the use of the weighing table to receive articles at a fixed rate of speed from a transport mechanism and carry the article across the weighing table in a frictionless manner, where at any aperture in the table the required pressure to support the article may be sensed and delivered to a pressure transducer. The pressure transducer utilizes a low voltage differential transformer having a movable transformer core which may be attached to a diaphragm reacting to the pressure sensed under the article being weighed. The transformer core is thus displaced by the diaphragm motion and delivers a voltage signal to circuitry designed to derive the numerical weight from the magnitude of that signal.

In a preferred embodiment a single action diaphragm may be utilized whereby the pressure sensed below the article being weighed is fed through a conduit to the diaphragm to directly move the transformer core. In an alternative embodiment, a differential diaphragm may also be utilized to perform this function, however, a reference pressure must be tapped from the air chamber unbalancing the diaphragm such that the pressure required to support the article moves the diaphragm toward a balanced condition, moving the transformer core in the process.

The present invention overcomes the disadvantages of damping, spacing requirements, and overall mechanical wear of the conveying belts by its independence of the transporting mechanism. It is a general object of the invention to pneumatically weigh a high volumn of products independent of the means for transporting the products to the weighing device. Further, since the device is pneumatic the problems associated with spring loaded scales do not exist and vibrations from the transport mechanism are not factors to be considered in the accuracy of the weighing function. Further, since the pneumatic scale is capable of transporting the article, the transport mechanism does not come in contact with this scale and thus a more conventional belt weight may be utilized to transport to and from the scale reducing mechanical wear problems.

BRIEF DESCRIPTION OF THE DRAWINGS

The above noted outstanding features and other features and advantages of the present invention will become more apparent upon reading the following detailed description in reference to the drawings in which.

DETAILED DESCRIPTION OF THE DRAWINGS

Figure 1:
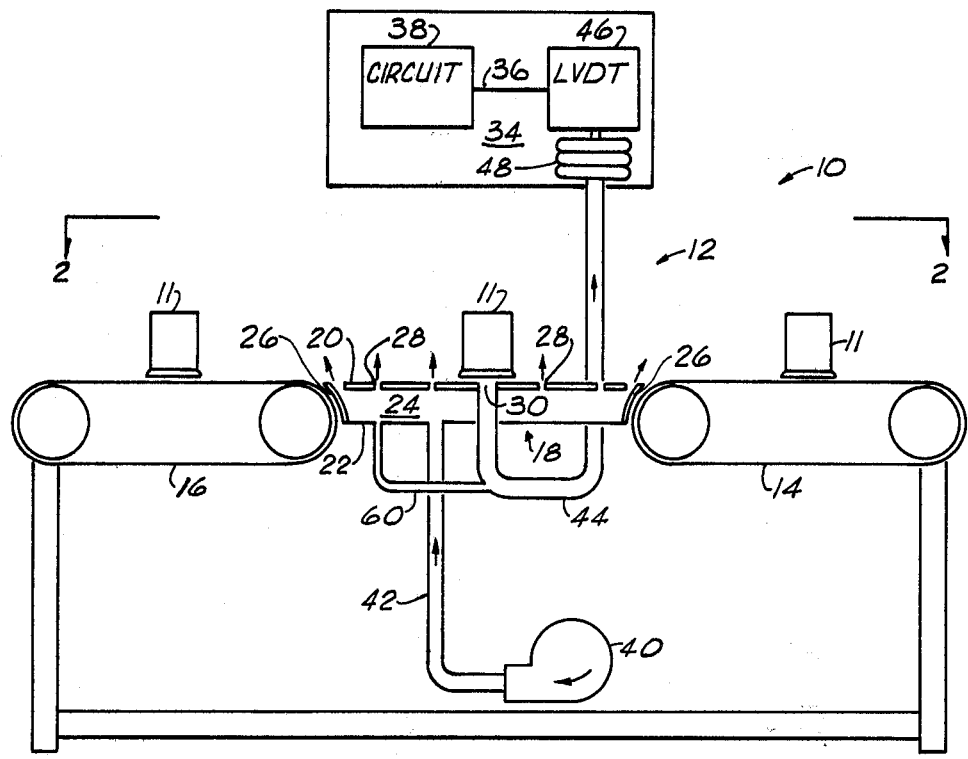
FIG. 1 is a diagrammatic front elevational view of a pneumatic weighing system using a single action diaphragm in accordance with the principles of the present invention.

Referring now to the drawings and more particularly to FIG. 1, a pneumatic weighing system 10 is illustrated. The pneumatic weighing system 10 comprises a pneumatic weighing device 12 and input and output transport mechanisms such as conveyances 14 and 16.

The pneumatic weighing device 12 includes a weighing table 18 having top and bottom planar members 20 and 22 defining an air chamber 24 therebetween. The weighing table 18 is further laterally enclosed with contoured sides 26 to facilitate movement of articles 11 from input conveyor 14 onto the weighing table 18 and ultimate discharge of articles 11 onto output conveyor 16.

Figure 2:
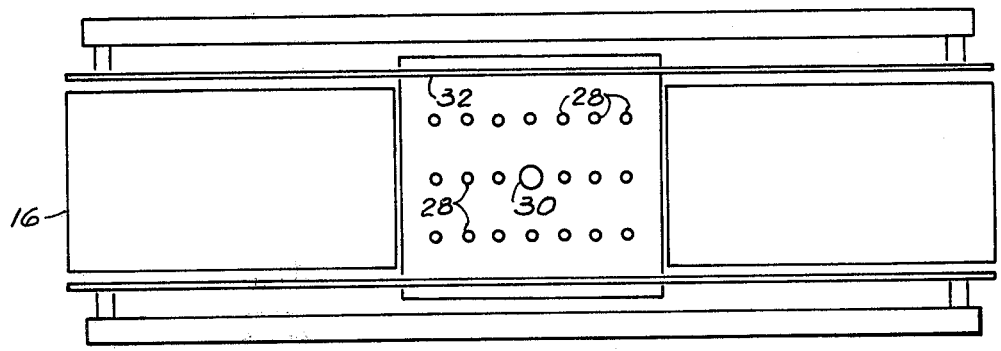
FIG. 2 is a diagrammatic top view of a weighing table and transport mechanisms in accordance with the principles of the present invention.

As shown in FIG. 2 the top planar member 20 of the weighing table 18 has a plurality of apertures 28. One of the apertures 30 is utilized for sensing the pressure under the article 11 and may be greater in diameter than the remainder of the apertures 28. The sense hole 30 must be large enough so not to restrict the pressure under the article 11 from passing through. Guide rails 32 are also provided to ensure that the article 11 passes over the aperture 30.

The pneumatic weighing device 12 further comprises a pressure transducer 34 electrically connected by conductor 36 to circuitry 38 for deriving the numerical weight of the article 11 by the proportional relationship of the pressure to support the article 11 to the article weight.

Operationally, pressurized air is supplied to the air chamber 24 from a compressor 40 by way of a flexible conduit 42. As a result of the pressurized air being fed to air chamber 24, air is forced out of the weighing table 18 by way of apertures 28. This escaped air forms an air cushion under the article 11 as it passes over the air table 18.

A conduit 44 connects the aperture 30 in the top member 20 of the weighing table 18 to the pressure transducer 34. The pressure transducer 34 comprises a low voltage differential transformer 46 having its transformer core attached to a diaphragm 48 which is directly connected to sense hole 30 by way of conduit 44.

Figure 3:
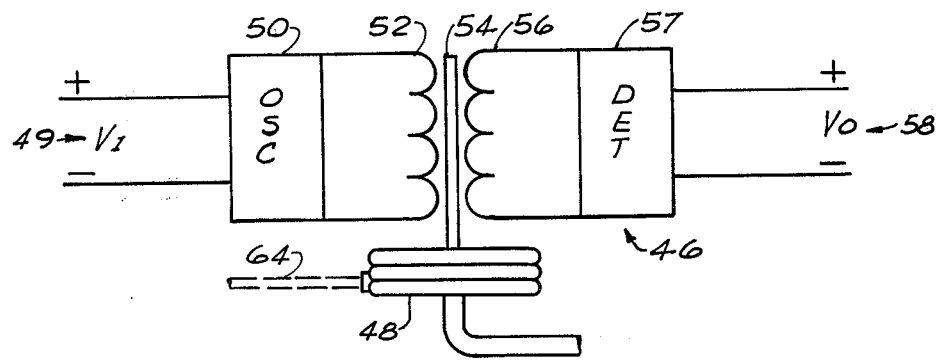
FIG. 3 is a partial schematic partial diagrammatic view of a pressure transducer utilized in the present invention.

FIG. 3 illustrates the pressure transducer 34 with a schematic view of the low voltage differential transformer 46. The low voltage differential transformer 46 is powered by a DC power source, $V_i$, 49, which may be on the order of 15 volts. This DC signal is received by an oscillator circuit 50 which drives a first transformer coil 52. The transformer core 54 is rigidly attached to a diaphragm 48. The diaphragm 48 may be a single action diaphragm as depicted in FIG. 1 requiring a single conduit 44 for determining pressure from the sense hole 30, or a differential diaphragm requiring a reference pressure to be delivered from the air chamber 24 by a conduit 64 depicted by the dotted lines in FIG. 3. As the transformer core 54 is moved between the first transformer coil 52 and a second transformer coil 56 the oscillating signal is coupled between coils and delivered to a detector circuit 57 where the signal is AC filtered and yields a DC output voltage, $V_o$, 58.

Calibrating the pneumatic weighing device 12 requires that the initial output voltage 58 from the low voltage differential transformer 46 be equal to zero. This zeroing function is accomplished by physically moving the transformer 46 such that the core is centralized to achieve an optimum coupling between coils 52 and 56 and thus a zero output voltage, 58. Further regarding the initial conditions on the pneumatic weighing device 12, that is, without the article to be weighed, the low voltage differential transformer is set to zero for convenience of operation, while the initial pressure on the diaphragm is not critical to this calibration. The pressure on the diaphragm which is mechanically connected to the transformer core may be a positive pressure, a zero or atmospheric pressure, or a negative or vacuum effect pressure. The pressure on the diaphragm will determine the placement of the transformer core and with proper calibration the voltage output of the low voltage differential transformer may be set to zero at that pressurization of the diaphragm.

As the article 11 is passed over the aperture 30 in the weighing table 18 the amount of pressure required to support the article is delivered through the conduit 44 to the diaphragm 48, which is in the form of a single action diaphragm in FIG. 1. The diaphragm 48 in turn displaces the transformer core 54 shown in FIG. 3 causing an inbalance in the low voltage differential transformer 46 resulting in an output voltage 58 which is indicative of the amount of pressure required to support the article 11. This output voltage signal 58 is then delivered by way of conductor 36 to circuitry 38 for deriving the numerical weight of the article 11 based upon the proportional relationship of the area and pressure to support the article 11 to the article weight.

The final back pressure induced through conduit 44 on the diaphragm 48, by the article 11 passing the sense hole, will be the same regardless of the initial pressure state of the diaphragm. Therefore, the output voltage 58 which is a function of the position of the transformer core is still indicative of the actual weight of the article passing the sense hole based upon the relationship of the area and pressure to support the article.

In order to initialize the proper proportional relationships for the circuitry 38 to evaluate, a further step in calibration is required. An article 11 having a predetermined numerical weight is placed on the device 12 the output voltage 58 at the low voltage differential transformer 46 is set to represent that numerical weight. Other articles having the same surface area will be weighed using a linear relationship between the pressure and weight based on the initial calibration parameters. The electronic circuitry 38 utilized in performing the calculation of the numerical weight may be the type utilized in the Dynachek Model 2000 and Minichek weighing devices made and manufactured by the assignee of the present invention.

Since the conduit 44 connecting the aperture 30 to the diaphragm 48 is held at atmospheric pressure, foreign particles are free to form a blockage in the conduit thus reducing the accuracy of the device. To prevent any particles from falling into the conduit 44, pressurized air is supplied from the air chamber 24 by way of a flexible conduit 60 coupled to the conduit 44. This supply of pressurized air to the conduit 44 performs a dual function. As stated above, foreign particles are prevented from falling into the conduit 44, further, air is supplied to the diaphragm 48 thus speeding the weighing action since the diaphragm is prepressurized to a point closer to the pressure received from beneath the article 11.

Figure 4:
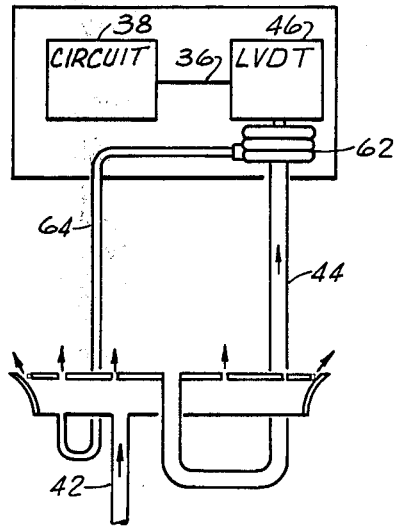
FIG. 4 is a diagrammatic front elevational view of a pneumatic weighing device utilizing a differential diaphragm in accordance with the principles of the present invention.

In an alternative embodiment shown in FIG. 4, a differential diaphragm 62 may be used in place of the single action diaphragm 48 shown in FIG. 1. The differential diaphragm 62 requires a reference pressure which may be received by way of a conduit 64 tapped into the air chamber 24. The reference pressure received from the air chamber 24 holds the differential diaphragm 62 in an unbalanced position with pressure received from beneath the article moving the differential diaphragm 62 to a balanced position, thereby moving the transformer core 54 shown in FIG. 3, and resulting in an output voltage 58 which may be translated into the numerical weight of the article 11. Since it is still necessary to prevent blockage of the conduit 44 in the alternative embodiment air supplied to the diaphragm 62 to effect a reference pressure is partially passed through the diaphragm to the sense hole 30 through the conduit 44 to prevent foreign particles from entering.

Although the invention has been described in its preferred form with a degree of specificity, it is understood that this description has been made only by way of example. Changes in the specifics of this embodiment will be apparent to those skilled in the art without departing from the spirit and scope of the invention.

What is claimed is:

1. A pneumatic device for determining the actual weight of an article comprising:
    a support;
    a weighing table disposed on said support, with said table having a first planar member with a plurality of spaced apertures therein, and a second planar member located beneath said first planar member in spaced parallel relationship, said first and second planar members laterally enclosed defining an air chamber therebetween;
    a compressor for providing pressurized air to said chamber through a conduit, thereby enabling said article to move across said first planar member in a frictionless manner; and,
    a pressure transducer, having an initial pressure setting and connected to a preselected one of said apertures, for translating pressure induced by the weight and surface area of said article passing over said selected aperture into an electrical signal representative of the actual weight of said article.

2. A pneumatic weighing device as set forth in claim 1, wherein said aperture connected to said pressure transducer has a diameter greater than the remaining plurality of apertures in said first planar member.

3. A pneumatic weighing device as set forth in claim 1, wherein said pressure transducer comprises a low voltage differential transformer and a diaphragm connected thereto.

4. A pneumatic weighing device as set forth in claim 3 wherein said low voltage differential transformer includes an oscillator for oscillating an input DC signal and delivering said signal to a pair of transformer coils coupled by a core material movable therebetween and connected to said diaphragm, and means for filtering said oscillating signal and delivering a DC output signal.

5. A pneumatic weighing device as set forth in claim 3 wherein said diaphragm is a differential diaphragm pneumatically connected by a first conduit to said air chamber to obtain a reference pressure, and pneumatically connected by a second conduit to one of said apertures in said first planar member to sense the pressure required to support said article to be weighed as it passes over said first planar member.

6. A pneumatic weighing device as set forth in claim 3 wherein said diaphragm is a single action diaphragm pneumatically connected by a first conduit to one of said plurality of apertures in said first planar member to sense the pressure required to support said article to be weighed as it passes over said first planar member, and where said first conduit is coupled to a second conduit connected to said air chamber for supplying air to said first conduit thereby preventing blockage by foreign particles.

7. A pneumatic weighing system comprising:
    a support;
    a weighing table disposed on said support, with said table having a first planar member with a plurality of spaced apertures therein, and a second planar member located beneath said first planar member in spaced parallel relationship, said first and second planar members laterally enclosed defining an air chamber therebetween;
    a compressor providing pressurized air to said chamber through a flexible conduit, thereby enabling an article to be weighed to move across said first planar member in a frictionless manner;
    a pressure transducer, having an initial pressure setting and connected to a preselected one of said apertures, for translating pressure induced by the weight and surface area of said article passing over said selected aperture into an electrical signal representative of the actual weight of said article;
    input and output transports for moving said articles to be weighed onto and off of said weighing table, and disposed in adjacent relationship and operably associated with said weighing table; and
    circuit means for providing the numerical weight of said article derived from said voltage signal.

8. A pneumatic weighing system as set forth in claim 7 wherein said input and output transports comprise endless belt conveyors.

9. A pneumatic weighing system as set forth in claim 7 further including a motor for driving said input and output transports.

10. A pneumatic weighing system as set forth in claim 7 wherein said weighing table is laterally enclosed with contoured side members for receiving said input and output transports.

11. A method for pneumatically determining the actual weight of an article comprising the steps of:
    supplying pressurized air to a weighing table, having a plurality of spaced apertures therein, for forming an air cushion thereon;
    transporting said article across said weighing table in a frictionless manner;
    sensing the pressure induced by the weight and surface area of said article as it passes a preselected one of said apertures connected to a pressure transducer;
    translating said induced pressure into an electrical signal representative of the actual weight of said article; and,
    calculating the actual numerical weight of said article, by a circuit means, from said electrical signal.

12. A pneumatic device for determining the actual weight of an article comprising a weighing table having a planar surface with a plurality of apertures therein, means for supplying pressurized air to said apertures in said weighing table, and a pressure transducer for having an initial pressure setting and connected to a preselected one of said apertures, for translating pressure induced by the weight and surface area of said article passing over said selected aperture into an electrical signal representative of the actual weight of said article.

13. A pneumatic device for determining the actual weight of an article comprising:

a support;

a weighing table disposed on said support, with said table having a first planar member with a plurality of spaced apertures therein, and a second planar member located beneath said first planar member in spaced parallel relationship thereto, said first and second planar members laterally enclosed defining an air chamber therebetween;

means providing pressurized air to said chamber thereby enabling said article to move across said first planar member in a frictionless manner;

a pressure transducer including a diaphragm mechanically connected to and operatively associated with a low voltage differential transformer, wherein said diaphragm has an initial pressure setting and is connected to a preselected one of said apertures defining a sensing aperture, for translating pressure induced by said weight and surface area of said article passing over said sensing aperture into an electrical signal by displacing the low voltage differential transformer such that an electrical signal output is achieved which is representative of the actual weight of said article; and, conduit means connected to said chamber and said connection between said sensing aperture and said diaphragm for keeping said preselected aperture free from debris and delivering an initial pressure setting to said diaphragm.

* * * * *

UNITED STATES PATENT AND TRADEMARK OFFICE
CERTIFICATE OF CORRECTION

PATENT NO. : 4,306,629

DATED : December 22, 1981

INVENTOR(S) : John L. Powell

It is certified that error appears in the above—identified patent and that said Letters Patent is hereby corrected as shown below:

Column 1, line 12, change "process," to --processes,--.

Column 2, line 35, change "volumn" to --volume--.

Column 3, line 8, change "conveyances" to --conveyors--.

Column 4, line 21, change "inbalance" to --imbalance--;

line 40, after "12" insert --.-- and change "the" (second occurrence) to --The--.

Column 5, line 11, after "embodiment" insert --,--.

Signed and Sealed this

Sixth Day of April 1982

|SEAL|

Attest:

GERALD J. MOSSINGHOFF

Attesting Officer    Commissioner of Patents and Trademarks